United States Patent [19]

Gebhard

[11] Patent Number: 4,836,573
[45] Date of Patent: Jun. 6, 1989

[54] COMBINATION INFANT STROLLER AND BABY BASSINET

[75] Inventor: Albert W. Gebhard, Denver, Colo.
[73] Assignee: Gerico, Inc., Denver, Colo.
[21] Appl. No.: 150,020
[22] Filed: Jan. 29, 1988
[51] Int. Cl.$^4$ .......................... B62B 7/10; B62B 7/14
[52] U.S. Cl. ................................. 280/644; 280/658; 280/47.41; 280/47.38; 280/648; 297/355
[58] Field of Search ............... 280/644, 642, 643, 641, 280/658, 47.38, 47.4, 47.41, 648, 47.39; 5/94, 99 R, 99 A, 99 B; 297/355

[56] References Cited

U.S. PATENT DOCUMENTS

| 457,006 | 8/1891 | Nesom | 280/644 |
|---|---|---|---|
| 2,989,318 | 6/1961 | Schenkman | 280/643 |
| 3,402,939 | 9/1968 | DeFalco | 280/47.38 |
| 3,430,273 | 3/1969 | Stillwaugh | 5/99 R |
| 3,550,998 | 12/1970 | Boudreau et al. | 280/31 |
| 3,871,701 | 3/1975 | Gesslein | 296/1 B |
| 4,019,751 | 4/1977 | Nakso | 280/31 |
| 4,438,941 | 3/1984 | Guillaume | 280/47.4 |
| 4,597,116 | 7/1986 | Kassai | 280/47.4 X |

FOREIGN PATENT DOCUMENTS 715239  8/1965  Canada ........................ 5/99 R

Primary Examiner—Charles A. Marmor
Assistant Examiner—Tamara L. Finlay
Attorney, Agent, or Firm—Sheridan, Ross & McIntosh

[57] ABSTRACT

An apparatus for supporting a child in a reclining position and in a sitting position is provided. A first planar member is suspended from a rim portion and is movable with respect to the rim portion from a first position spaced from the rim to a second position in which an edge of the first planar member is substantially adjacent to an edge of the rim. A second planar member extends from an edge of the rim to the first planar member. In a first configuration, the first planar member acts as a whole body support for a child to provide a bassinet or baby carriage configuration. In the second configuration, the first planar member is provided as a back rest and the second planar member is provided as a seat. The child support is pivotable from a first, generally horizontal position for use as a bassinet to a second, inclined or tilted position for use as a stroller.

17 Claims, 7 Drawing Sheets

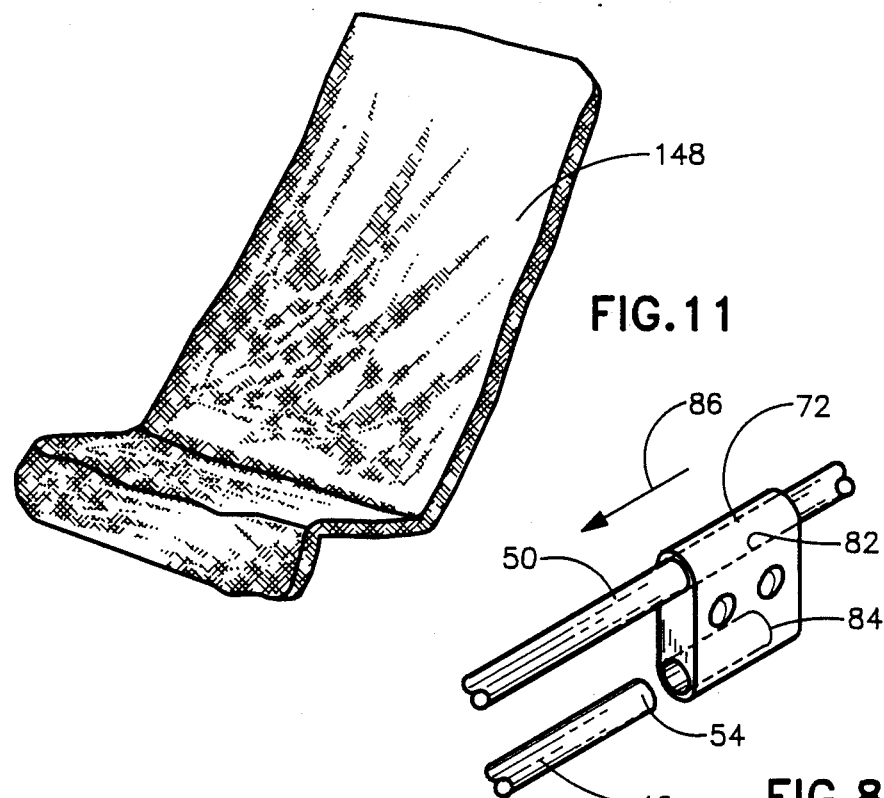
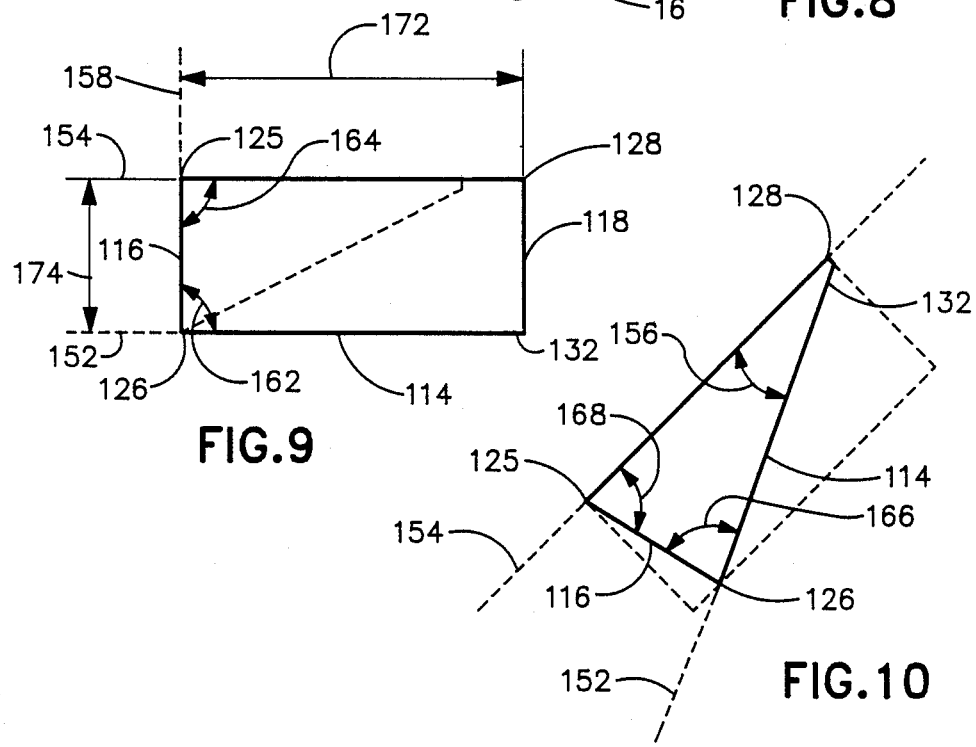

COMBINATION INFANT STROLLER AND BABY BASSINET

FIELD OF THE INVENTION

The present invention relates to apparatus for supporting a child in a reclining position and in a sitting position and, in particular, to a support device convertible between an infant or toddler stroller configuration and a baby bassinet configuration.

BACKGROUND INFORMATION

Apparatus for child care includes a number of devices intended to support the child in one or more postures, such as lying, sitting or standing. Use of a different apparatus for each purpose results in the necessity for accumulating a number of separate devices. Such accumulation not only creates additional cost for such apparatus but also creates a need for storage space and often requires transportation of several separate devices when traveling with a child. Partly because of this fact, attempts have been made to develop apparatus which serve more than one purpose, such as being convertible from a configuration appropriate for one use to a configuration appropriate for another use. The differing uses can be uses which occur at different times of the day or uses which occur during different periods of development during the child's life.

One example of a convertible device is described in U.S. Pat. No. 3,550,998, issued Dec. 29, 1970 to Boudreau, et al. In this device, a rigid body is mounted on running gear so that it can be oriented from a generally upright position to a generally horizontal position. However, because the chIld support portion is a rigid body, it is not itself reconfigured between the stroller configuration and the carriage configuration. The carriage configuration is appropriate only for supporting the child in a supine and not in a prone position. Moreover, there is no side wall or end wall protection in the area of the head or foot and there is no change of relationship between the seat portion and back portion during the change in configuration.

In this connection, it is important to note that a bassinet, baby carriage or baby buggy configuration is traditionally found most useful for young infants, for example, up to the age of about five or six months. After this age, children typically asssume a sitting position and are often too active to be easily transported in a bassinet-shaped child support. Further, typically at an age of 12 to 18 months, the child is too large to lie in the bassinet with full body support, i.e. substantially planar support from head to foot.

On the other hand, parents of children less than five or six months are often reluctant to position such children in a stroller configuration because such young children are typically less able to support themselves in an upright posture. Once children are of an age where they can support themselves in an upright or sitting posture from approximately the age of five or six months, a stroller is often used and can be useful up to the age at which the child is too large to be accommodated by the stroller, for example, at three to four years.

Thus, children up to age five or six months are often transported in a bassinet or carriage and less frequently in a stroller configuration while after the age of five or six months, children are less frequently transported in a bassinet and more frequently in a stroller.

One manner of dealing with the transition from predominantly recumbent posture to predominantly upright posture is illustrated in U.S. Pat. No. 3,871,701, issued Mar. 18, 1975 to Gesslein. In this patent, part or all of the floor portion of the carriage is lowered to accommodate a sitting, standing or kneeling infant. In this patent, the same member, or a portion thereof, which is used for horizontal support in recumbent position is also used for horizontal support for the upright position. The change in configuration requires pivoting of several parts about several axes and the resultant structure can be relatively expensive to construct and requires a number of relatively expensive pivoting parts. The dropped-bottom configuration has an increased volume with respect to the original configuration which must be accommodated or taken into account in connection to the running gear, particularly when the running gear is foldable. The side walls retain their original configuration during the dropping of the floor and positioning of the sun shade must be made considering the shading effect of the side walls.

Accordingly, there is a need for a child support device which is convertible between a configuration appropriate for a reclining position and a configuration appropriate for a sitting position which can accommodate a plurality of postures in the reclining position and which is relatively inexpensive in terms of the necessary parts and in terms of the difficulty of construction. There is further a need for such an apparatus which is relatively easy to convert from one configuration to another and can preferably be converted using a single hand, such as when the other hand is holding a child.

SUMMARY OF THE INVENTION

An apparatus for supporting a child in a reclining position and in a sitting position is provided in which the portion used for whole body support in the carriage configuration can be tilted with respect to the frame or rim to a second angular configuration in which one edge of the planar portion is closer to or adjacent to one of the frame edges. It hs been found that by making the child support tiltable as a whole, it is possible to use a member which forms a side wall in the bassinet configuration, as a seat in the stroller configuration and to use the whole body support member of the bassinet configuration as the back rest (i.e. the portion supporting the child along the spine and head but not the legs) in the stroller configuration. The apparatus provides for a simple method of reconfiguration, which can be substantially accomplished with one hand, and requires relatively inexpensive parts and methods of construction. The apparatus permits both supine and prone positions in the carriage configuration and, in the stroller position, accommodates children of a size larger than would be accommodated in the bassinet configuration. Thus, the usual life of the apparatus extends from essentially newborn children to children of an age and size at which the child has outgrown the stroller. The apparatus is configured so that when the back is attached in the inclined position appropriate for the stroller, the seat is thereby also positioned in the appropriate stroller configuration, and in particular, is held, against the urging of gravitym from assuming an excessive "bucket seat" shape. By positioning an edge of the back rest against an edge of the frame, the head support section in the stroller configuration eliminates protruding side walls, permitting a view and permitting shading to be controlled almost exclusively by the shade screen, as opposed to side walls. The change in configuration from bassinet to stroller, although permitting accommodation of a larger child, decreases the cavity volume.

BRIEF DESCRIPTION OF THE DRAWINGS

FIG. 8 is perspective partial view of a folding lock apparatus of the present invention showing the apparatus in an unlocked configuration;

FIG. 9 is a schematic diagram of a longitudinal cross section through the child carrier in the bassinet configuration;

FIG. 10 is a schematic diagram of a longitudinal cross section through the child carrier in the stroller configuration; and FIG. 11 depicts a pad positionable in the child carrier.

DETAILED DESCRIPTION OF THE PREFERRED EMBODIMENT

Figure 1:
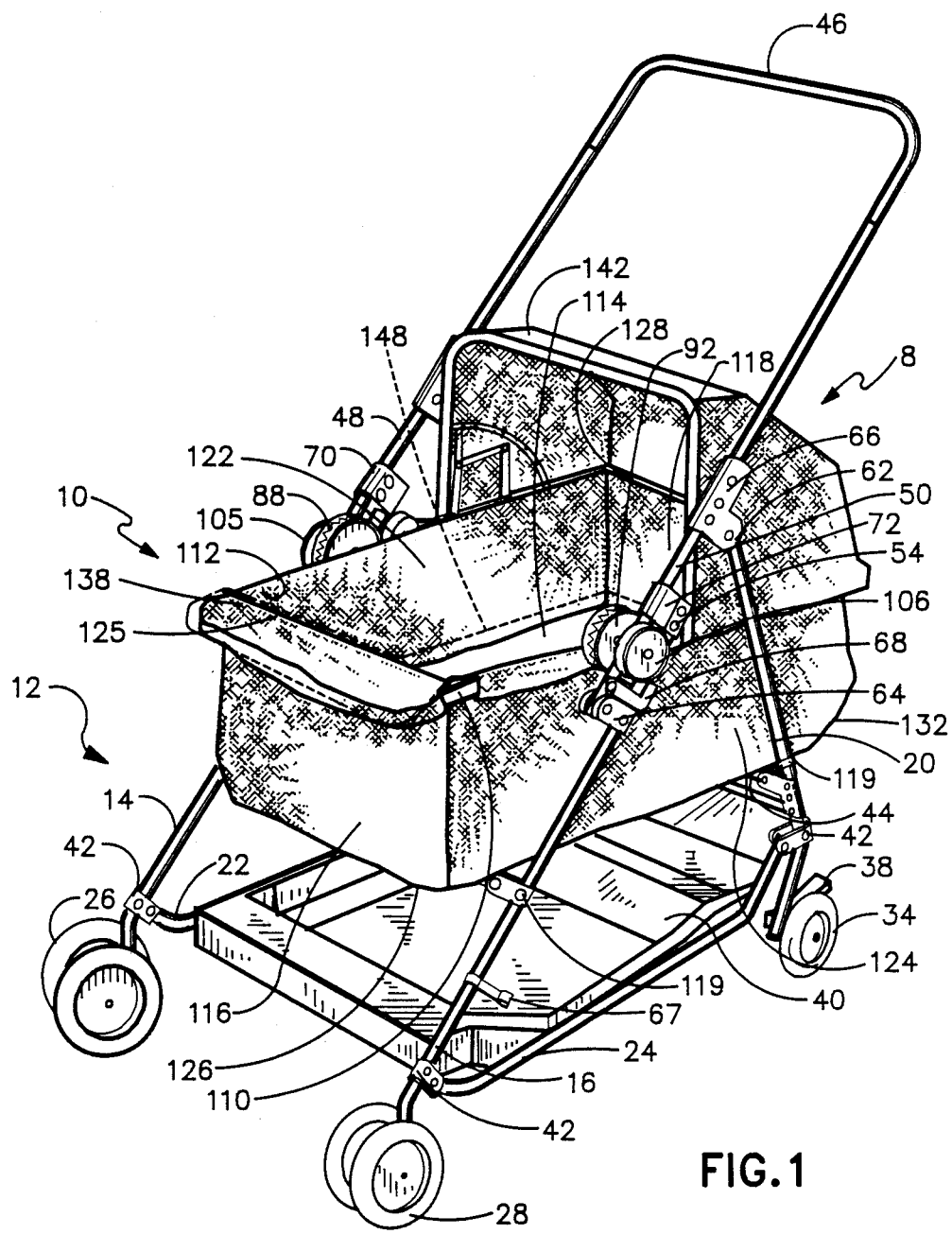
FIG. 1 is a perspective view of the child support apparatus of the present invention in the configuration for supporting a child in a reclining position.

A child support apparatus according to the present invention includes apparatus which is convertible between a configuration for supporting a child in a reclining position and a configuration for supporting a child in a sitting position. Referring now to FIG. 1, the apparatus 8 includes a child support device 10 attached to running gear 12. The running gear 12 includes first and second front legs 15, 16 attached to first rear leg (not shown) and second rear leg 20 by first and second side tubes 22, 24. First and second front wheels 26, 28 are rotatably mounted on the first and second front legs 14, 16 in a well known manner, such as using wheel bearings (not shown). The first and second front wheels 26, 28 are preferably of a double construction, each comprising two tires mounted on a common axle. First rear wheel not shown) and second rear wheel 34 are rotatably attached to the first rear leg and second rear leg 20, respectively, in a manner well known, such as by using wheel bearings (not shown). First foot lever (not shown) and second foot lever 38 are provided for activating brakes or locks (not shown) for the first rear wheel and second rear wheel 34 in any of a number of well known locking configurations.

A tray 40 is suspended between the first and second side tubes 22, 24 for storage and to provide additional structural stability to the running gear 12. The first and second side tubes 22, 24 are pivotally attached at each end thereof to the first and second front legs 14, 16 and first rear leg and second rear leg 20, respectively, such as by riveted brackets 42. The pivoting connection permits movement of the first and second front legs 14, 16 and first rear leg and second rear leg 20 with respect to the first and second side tubes 22, 24 to the folded configuration depicted in FIG. 7. Additional bracing members, such as rear brace 44, are provided additional stability.

Figure 7:
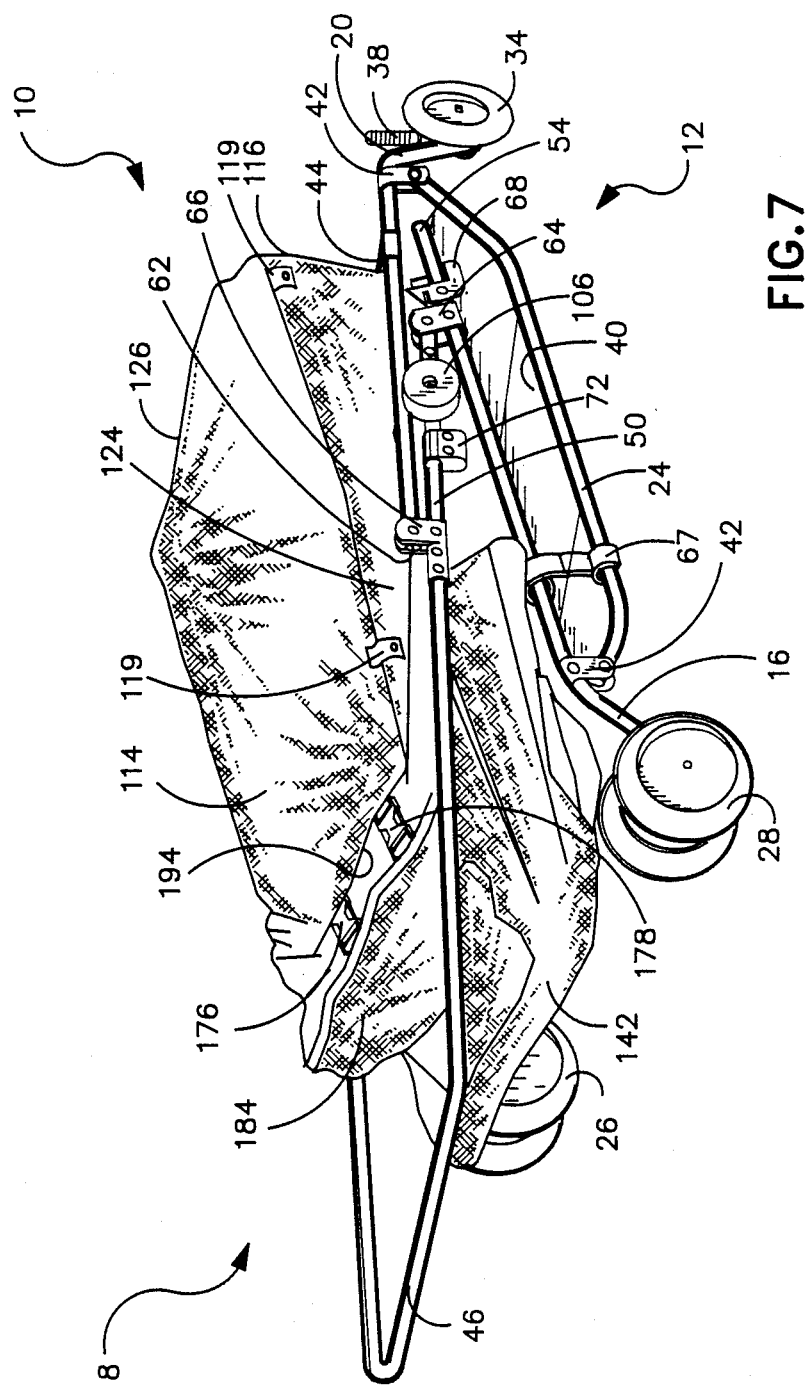
FIG. 7 is a perspective view of the child support apparatus of the present invention shown in a folded configuration.

A U-shaped handle 46 is attached so that the lower portions 48, 50 of each leg of the U-shaped handle 46 extend between the upper ends 54 of the front legs 14, 16 and the upper ends 62 of the first rear leg and second rear leg 20. The handle 46 is attached to the front legs 14, 16 and first rear leg and second rear leg 20 in a pivoting manner, such as by first rivet bracket (not shown) and second rivet bracket 66. The pivoting connection permits pivoting of the handle 46 with respect to the front legs 14, 16 and first rear leg and second rear leg 20 from the position depicted in FIG. 1 to the position depicted in FIG. 7. As depicted in FIG. 7, the front legs 14, 16, first rear leg and second rear leg 20 handle 46 have been pivoted with respect to each other such that they are all substantially parallel to the first and second side tubes 22, 24. Such pivoting permits the running gear 12, with the child support device 10 attached, to be collapsed or folded to a compact configuration, such as that depicted in FIG. 7, to provide for ease of handling and storage. In the folded configuration, a folding clasp 67, which is attached to a front leg 16, engages with a side tube 24 to hold the apparatus 8 in the folded configuration depicted in FIG. 7.

Figure 2:
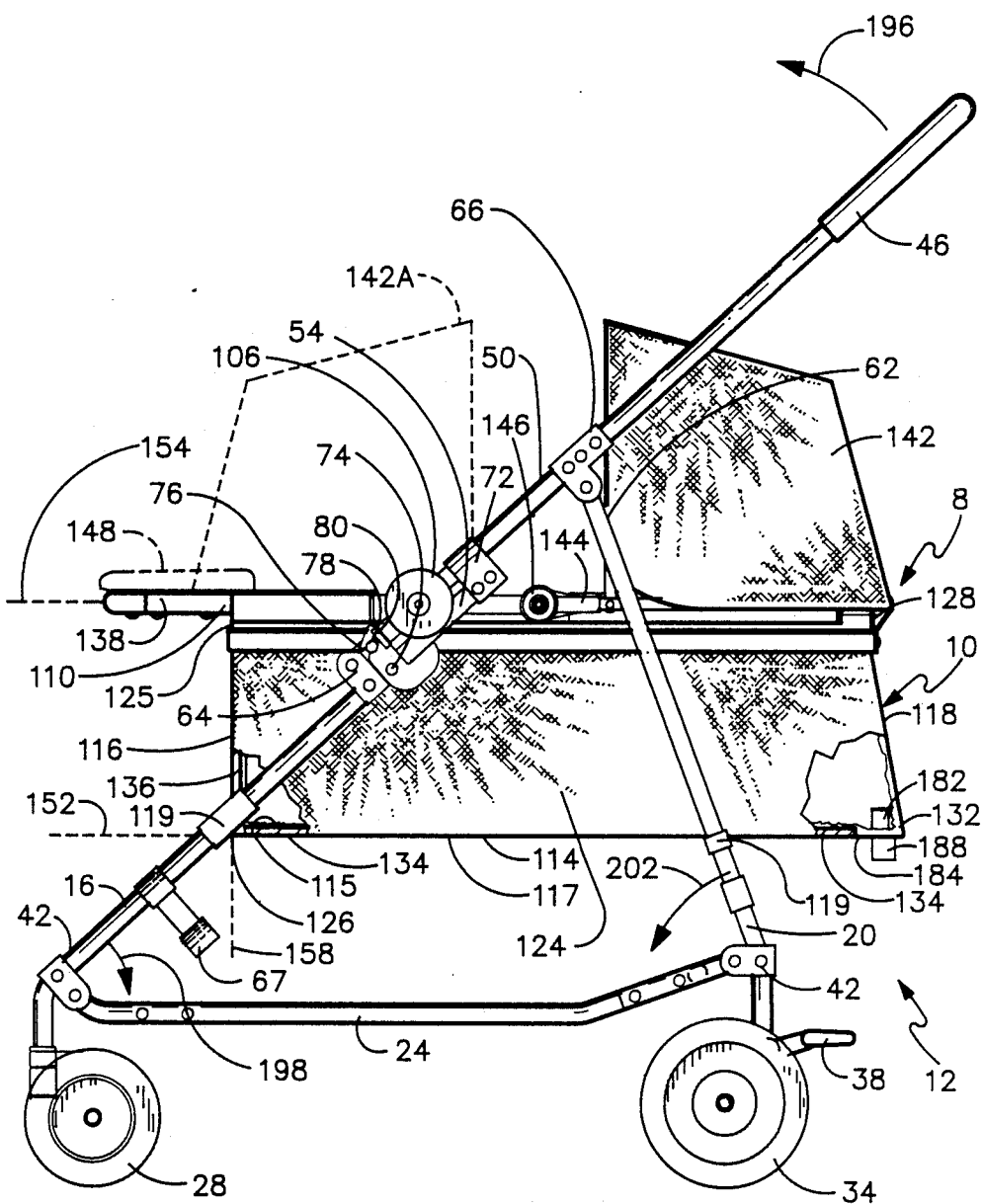
FIG. 2 is a side elevational view of the apparatus of FIG. 1 with a portion broken away to show the bottom latching device.

When the apparatus is unfolded to its operative configuration, as depicted in FIG. 1, the relative position of the first and second front legs 14, 16, first rear leg and second rear leg 20, first and second side tubes 22, 24, and handle 46 are maintained and held in a safe and stable condition using a folding latch 68 and a folding lock 72. As best seen in FIG. 2, the folding latch 68 is pivotally attached by a pin 74 to the second front leg 16 so that a cut-out portion 76 fits around a post 78 which is formed in the handle 46. The folding latch 68 is urged towards engagement with the post 78 by a helical spring, leaf spring, or other urging device (not shown) and is pivotable against the urging of the spring by a handle 80.

As best shown in FIG. 8, the folding lock 72 comprises a block of material, such as plastic, wood, or the like, having first and second generally cylindrical and generally parallel holes 82, 84 formed therein. The second hole 84 extends only partially through the folding lock 72. The first and second lower portions 48, 50 of the handle 46 extend through the first hole 82 and the folding lock 72 is longitudinally slidable with respect to the legs of the handle 46. When the folding lock 72 is in the unlocked position, as depicted in FIG. 9, the folding lock 72 is slid upward on the handle leg 50 so that the upper end 54 of the front leg 16 is spaced from the folding lock 72. When the folding lock 72 is in the locking configuration, the folding lock 72 is slid downward on the handle leg 50 in the direction indicated by the arrow 86 so that the upper end 54 of the front leg 16 is inserted into the second hole 84.

As seen in FIG. 1, the running gear 12 is attached to the child support device 10 by first and second pivot locking devices 88, 92. The pivot locking devices 88, 92 include toothed disks. The teeth of the disks are complimentary and engageable with each other. Preferably, the locking devices 88, 92 also include stops (not shown) to prevent rotation or pivoting of the child support 10 beyond either of the two extreme positions depicted in FIGS. 2 and 4, respectively. The disks are brought into toothed engagement by compression of, for example, a nut and bolt (not shown). The bolt is preferably attached to a handle 106 for bringing the teeth of the disks into engagement with one another against the urging of a spring (not shown). The first disk is attached to a generally rectangular frame 110 defining the rim of the child support device 10. The second disk is attached to the lower legs 48, 50 of the handle 46. Turning the handles 105, 106 to disengage the teeth of the pivot locking devices 88, 92 permits pivoting of the child support device 10 with respect to the running gear 12 about an axis defined by the centers of the pivot locking devices 88, 92. Turning the handles 105, 106 so that the teeth of the locking devices 88, 92 are engaged locks the child support device 10 against pivoting with respect to the running gear 12.

The child support device 10 defines a volume or cavity 112. The cavity 112 is defined by the rim 110 and a first planar member 114, having first and second surfaces 115, 117, at least partially spaced from the rim 110. The first planar member 114 is preferably anchored to the front legs 14, 16 and first rear leg and second rear leg 20 by flexible anti-sway tabs 119 for preventing excessive swinging or swaying of the first planar member 114. The anti-sway tabs 119 can be made of any strong flexible material, such as nylon web, plastic, rubber, cloth or leather, and are removably connected to the front legs 14, 16 and first rear leg and second rear leg 20, such as by snaps. As depicted in FIG. 1, when the apparatus is in the configuration appropriate for supporting a child in a reclining position, the first planar member 114 is substantially horizontal and forms the bottom or floor of a bassinet, baby carriage, or baby buggy device. The first planar member 114 is attached to the rim 110 by suspension from the rim 110. As depicted in FIG. 1, the suspension is accomplished by wall members including a second planar member 116, an end wall 118, and first and second side walls 122, 124.

The second planar member 116 extends between a second end edge 125 of the rim 110 and a second end edge 126 of the first planar member 114. The end wall 118 extends between the first end edge 128 of the rim 110 and the first end edge 132 of the first planar member 114. The first planar member 114, second planar member 116, end wall 118, and side walls 122, 124 preferably include a flexible material, such as nylon mesh, cloth, plastic or leather. The first planar member 114 and second planar member 116 are preferably reinforced with first and second rigid or resilient members attached to the cloth or other flexible material, such as by gluing, bonding, stitching, and the like. The rigid or resilient material can be made of any materials sufficient for supporting the weight of the child including plastic, wood, particle board, masonite, metal, rubber, or leather. A padded shelf 138 extends outward from the second end edge 125 of the rim 110 for a purpose to be described below.

As seen in FIG. 2, a screen or bonnet 142, such as a folding sun screen of the type used in baby carriages, is pivotally attached to the rim 110 by an arm 144 connected to a joint 146. The screen 142 can be pivoted about the joint 146 from the position depicted in FIG. 2 to the position depicted, in phantom lines, in FIG. 2 142A, or a position intermediate therebetween. A pad 148, as depicted in FIG. 12, is positioned in the cavity 112, as shown by phantom lines in FIG. 1. The pad 148 is preferably held in place, such as by velcro-lined cloth tabs 149, depicted in FIG. 3.

As depicted in FIG. 2, when the apparatus is in the configuration appropriate for supporting the child in a reclining position, the first planar member 114 defines a substantially horizontal first plane 152. Similarly, the rim 110 defines a second plane 154 which, in the embodiment depicted in FIG. 2, is also substantially horizontal. The first planar member 114 is movable with respect to the second plane 154 of the rim 110 so that the angular relationship between the first plane 152 and the second plane 154 can be changed. The change in angular relationship is depicted schematically in FIG. 9 and FIG. 10. As depicted in FIG. 9, the first plane 152 is substantially parallel to the second plane 154 in a first configuration. In a second configuration, depicted schematically in FIG. 10, the first planar member 114 has been moved to a position defining an angle 156 between the first plane 152 of the first planar member and the second plane 154.

The second planar member 116 also defines a third plane 158 which, in the bassinet configuration, depicted in FIG. 2, is substantially vertical. The second planar member 116 is movable with respect to the rim 110 so as to enable changing the angular relationship between the first plane 152 of the first planar member 114 and second plane 154 of the rim 110. As depicted in FIG. 9, in the bassinet configuration, the second planar member 116 makes a second angle 162 with the first planar member 114 and makes a third angle 164 with the second plane 154. As depicted in FIG. 10, in a second configuration such as a stroller configuration, the second planar member 116 makes a fourth angle 166 with the first planar member 114 and a fifth angle 168 with the second plane 154. The second planar member 116 is movable so that either the second angle 162 is different from the fourth angle 166 or the third angle 164 is different from the fifth angle 168. Preferably, both the second angle 162 is different from the fourth angle 166 and the third 164 is different from the fifth angle 168.

When the first planar member 114 and second planar member 116 are pivotally connected, such as by being attached by a flexible material such as nylon mesh, movement of the first planar member 114, as depicted in FIG. 10, also automatically causes movement of the second planar member 116. This is because positioning the first end edge 132 of the first planar member 114 adjacent to the first end edge 128 of the rim 110 causes movement of the second end edge 126 of the first planar member 114 in a direction generally towards the end wall 118 causing the attached bottom portion of the second planar member 116 to also move towards the end wall 118. This movement towards the end wall 118 causes the second planar member 116 to pivot about the second end edge 125 of the rim 110 to assume the position depicted schematically in FIG. 10.

The amount of pivoting of the second planar member 116 will depend, at least in part, on the relationship between the length 172 of the first planar member 114 and the height 174 of the second planar member 116. By adjusting this relationship, the angular relationship between the rim plane 154, first planar member plane 152, and second planar member plane 158 are adjusted so that the second configuration provides for increased comfort of a child seated on the second planar member 116 and employing the first planar member 114 as a back rest in the configuration depicted in FIG. 10. In the preferred embodiment, the length 172 of the first planar member 114 is about 21 inches and the height 174 of the second planar member 116 is about 8 inches. In this manner, the described angular relationship is achieved simultaneously and automatically by the described positioning of the first planar member 114.

Figure 5:
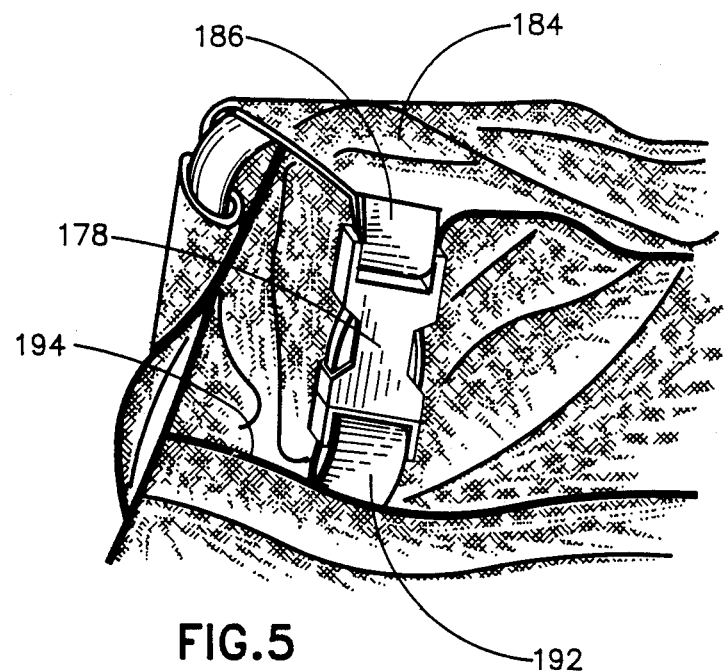
FIG. 5 is a rear detail view of the apparatus as depicted in FIG. 3 showing the back latching device in an engaged configuration.
Figure 6:
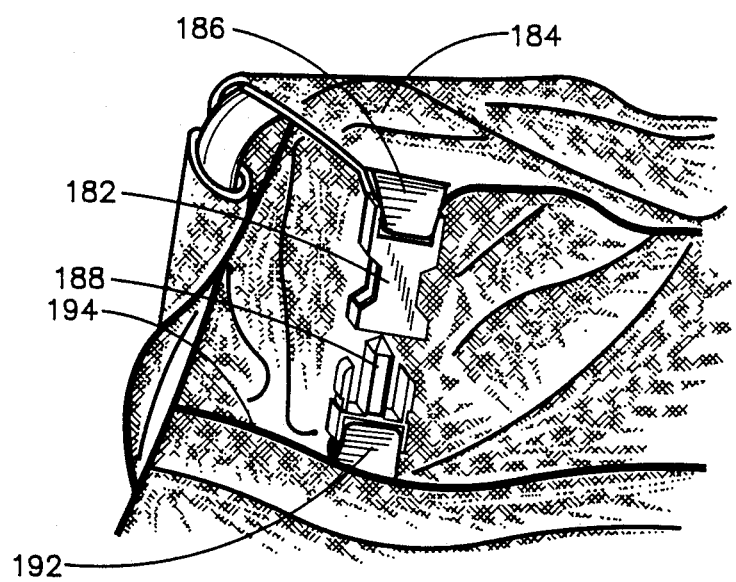
FIG. 6 is a partially exploded view of the apparatus of FIG. 5, but with the back latching device in an unlatched configuration.

After the positioning of the first planar member 114 to the position depicted in FIG. 10, the first planar member 114 is maintained in the desired position by first back positioning latch (not shown) and second back positioning latch 178. As shown in detail in FIGS. 5 and 6, the latch 178 includes a female latch member 182 and a male latch member 188. The female latch member 182 is attached to the fabric or flexible portion 184 of the first planar member 114 by a first strap 186. The male latch member 188 attached to the exterior surface of the first planar member 114 by a second strap 192. Preferably, the male latch member 188 is containable in a pocket 194 to conceal the male latch member 188 and prevent snagging when it is not in use. The fabric portion 184 substantially covers and pads the first end edge 128 of the rim 110 when placed in the position depicted in FIGS. 5 and 6.

The operation and manner of use of the apparatus of the present invention will now be described. Beginning with the configuration depicted in FIG. 1, when it is desired to convert the apparatus from the configuration depicted in FIGS. 1 and 2 to the stroller configuration depicted in FIGS. 3 and 4, the anti-sway tabs 119 are released from the front legs 14, 16 and first rear leg and second rear leg 20, the handles 105, 106 are loosened to permit pivoting of the rim 110 as described above, and the rim 110 is pivoted from the position depicted in FIG. 2 to the position depicted in FIG. 4. The rim 110 can also be positioned in intermediate degrees of tilting. The above-described steps of the pivoting locking devices 88, 92 prevent over-pivoting of the child support device 10, such as pivoting to a position in which the child support device 10 would be unstable. The handles 105, 106 are then rotated to engage the teeth of the pivot locking devices 88, 92 to prevent any further pivoting of the rim 110 or child support device 10 with respect to the running gear 12. At least the above-described steps can be accomplished with one hand.

The first planar portion 114 is then moved, such as by grasping the planar portion 114 or a portion of the fabric attached thereto. The first planar portion 114 is moved to position the first end edge 132 thereof substantially adjacent to the first end edge 128 of the rim 110. Positioning of the first planar member 114 in this manner also effects positioning of the second planar member 116, as described above. The female latch members 182 are grasped and moved around the top of the first end edge 128 of the rim 110 and brought into engagement with the male latch members 188 to hold the first planar member 114 in the desired position.

Figure 3:
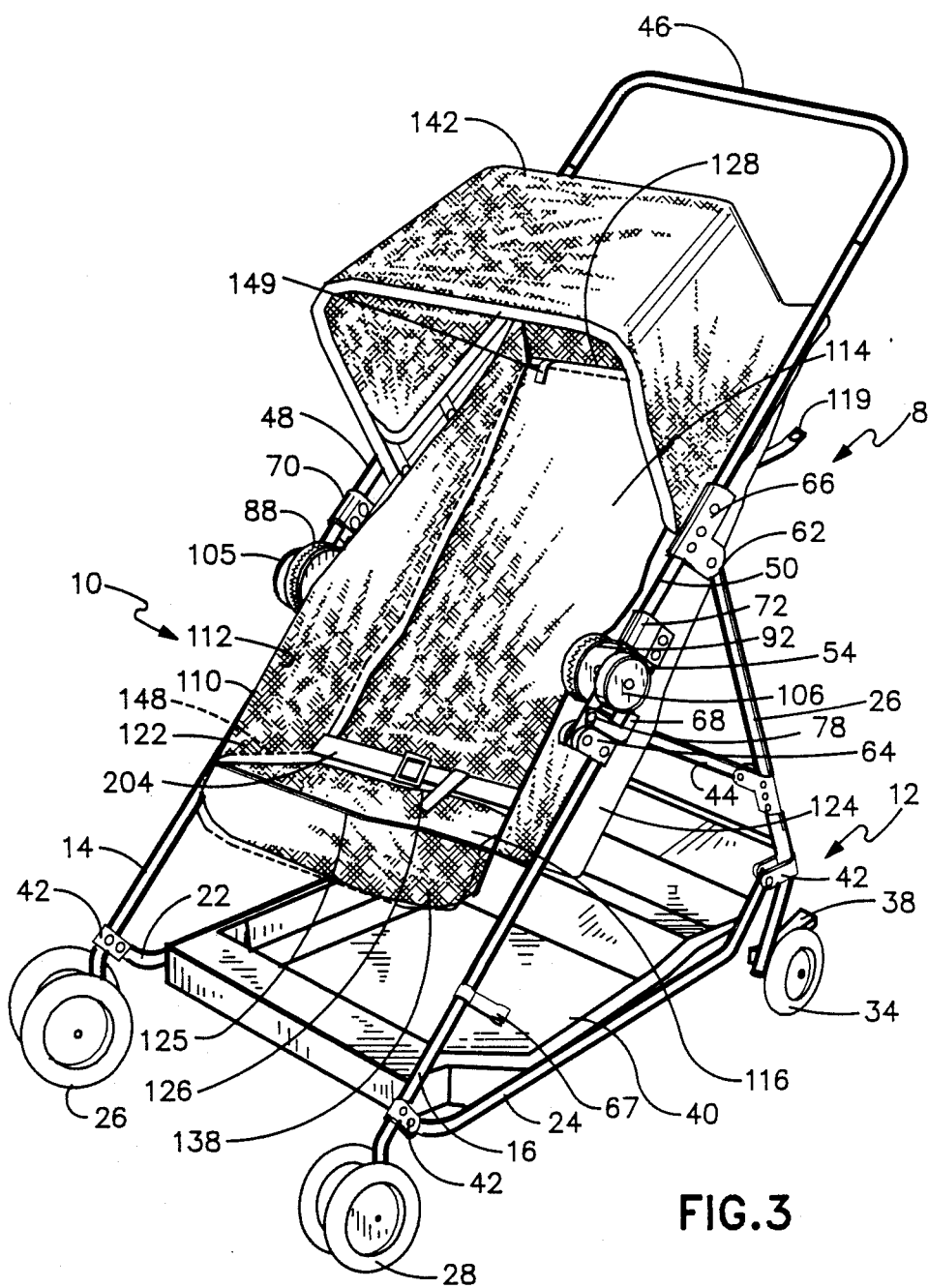
FIG. 3 is a perspective view of the child support apparatus of the present invention in the configuration for supporting the child in a sitting position.
Figure 4:
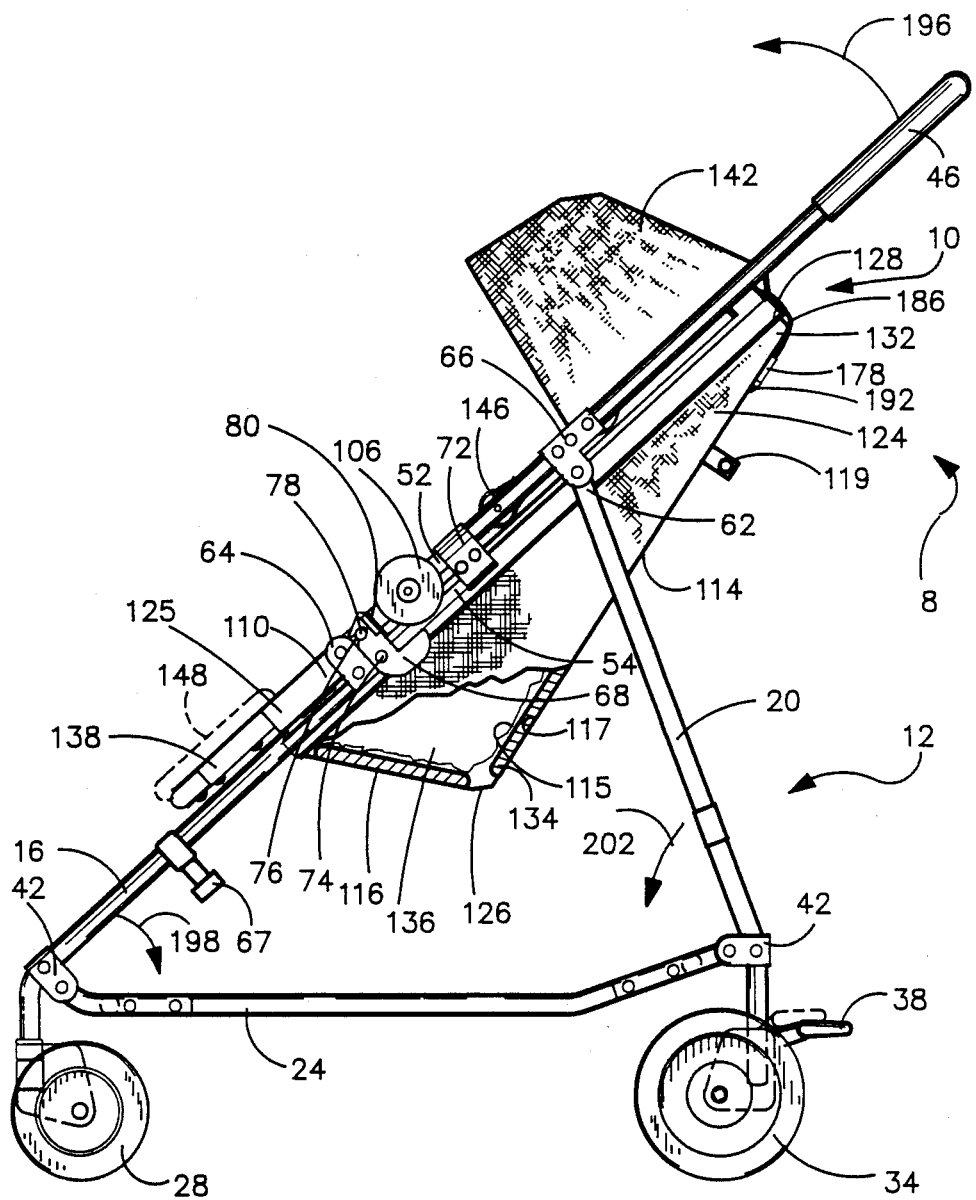
FIG. 4 is a side elevational view of the apparatus of FIG. 3 with a portion broken away showing the bottom support device and the side support device.

In the second configuration of the first planar member 114, as depicted in FIGS. 3 and 4, the child support device 10 is in a desired position for use as a stroller. In this configuration, the second planar member 116 is positioned for use as a seat and the first planar member 114 is positioned for use as a back rest. The angular relationship between the seat and the back rest and the angular relationship between the seat and the rim are such as to provide for comfort and safety of the child. Because the head portion of the first planar member is adjacent to the rim 110, the child is afforded a view while seated in the stroller. Furthermore, because the side walls 122, 124 in the region of the head portion are small or non-existent, control of shading can be effected by the positioning of the bonnet 142 and substantial shading by the side walls, which cannot be easily adjusted, is avoided. Because the first planar member 114 supports the bottom edge 126 of the second planar member 116, the tendency of the second planar portion 116 to sag under the effect of gravity and to create a "bucket seat" is reduced or eliminated. The upper portion of the legs of the child are supported by the padded ledge 138 and the pad 148. A seat belt 204, harness or other restraint device is provided to limit movement of the child.

When it is desired to fold the apparatus into the folded configuration depicted in FIG. 7, the shade 142 is preferably first collapsed to its folded position in a well-known manner. The folding locks 70, 72 are disengaged by moving the folding locks 70, 72 upward on the legs 48, 52 of the handle 46 to the disengaged position, as depicted in FIG. 8. The folding latch 68 is disengaged by pushing on the handle 80 to pivot the latch about the pin 74 moving the cut-out 76 out of engagement with the post 78. The handle 46 is then moved forward to pivot the handle in the direction indicated by the first arrow 196 in FIG. 4. Because of the linkages created by the pivoting riveted brackets 42, first rivet bracket and second rivet bracket 66, the described movement of the handle 46 causes movement of the front legs 14, 16 in the direciton indicated by the second arrow 198 in FIG. 4 and also causes movement of the first rear leg and second rear leg 20 in the direction indicated by the third arrow 202 in FIG. 4 to assume the configuration depicted in FIG. 7. The folding clasp 67 engages with the side tube 24 to hold the apparatus 8 in the folded configuration.

When it is desired to unfold the apparatus from the configuration depicted in FIG. 7 to the unfolded configuration depicted in FIG. 4, the steps of folding are conducted in reverse order and direction, to bring the running gear members into the configuration depicted in FIG. 4. The folding latch 68 engages with the post 78 and the folding locks 72 are slid downward on the first and second legs 48, 52 of the handle 46 to assume the locked position depicted in FIG. 4, as described above.

When it is desired to convert the apparatus from the configuration depicted in FIG. 3 to the configuration depicted in FIG. 1, the first back positioning latch and second back positioning latch 178 are disengaged, such as by compressing the male latch members 188 and the first planar member 114 is pushed away from the rim 110 to assume the configuration depicted in FIG. 1. The handles 105, 106 are loosened to disengage the first and second pivot locking devices 88, 92 and the child support device 10 is pivoted to the position depicted in FIG. 1. The handles 105, 106 are then rotated to engage the first and second pivot locking devices 88, 92 to lock the child support device 10 against further pivoting and the anti-sway tabs 119 are engaged with the front legs 14, 16 and first rear leg and second rear leg 20.

In light of the above description, a number of advantages of the present invention can be seen. A child support which is convertible from a horizontal bassinet-type configuration to an angled stroller-type configuration in which the child carrier has one member convertible from a whole body support to a back rest and another member convertible from an end wall to a seat. In this way, the apparatus is useful through a range of child ages and sizes from newborn to up to four years or more. The whole body support in the bassinet configuration can support a child in both a prone and a supine position. Because the change in configuration of the carrier involves pivoting of substantially planar members with respect to each other, such change in configuration can be achieved using simple cloth hinges avoiding the use of more expensive multiple pivoting members and angled members and the cost of construction associated therewith. Conversion to a sitting-position carrier involves a decrease of the volume of the carrier, with respect to the bassinet configuration, and thus does not require accommodation of an increased volume, as in previous devices, when the stroller is to be folded. The tilting operation can be substantially achieved using one hand, for example, while holding a child in the other hand. The head of the child in the stroller configuration is substantially even with or raised above the side walls so that shading can be controlled exclusively by a bonnet or shade member. The sun screen or bonnet is movable so that the device in the bassinet configuration can be used with the child's head at either end. The adjustment of the whole body support member to a back rest position also automatically effects adjustment of the angle of the seat member to provide for comfort and safety of the child.

In light of the above description, a number of variations and modifications of the above-described embodiment will be apparent to those skilled in the art. The running gear 12 can be provided in a non-folding configuration or in a configuration with different folding or locking means, including accordion folding methods, diamond folding methods, and others well known. The running gear can be replaced with a sliding or a non-moving support device and the child support device 10 can be suspended by springs or other devices to provide for swinging or bouncing movement. Other back positioning latch devices can be used, including belt-type straps, ties, hooks and eyes, and buttons. The child support device 10 can be configured to be removable from the running gear 12 to act as a child's bed, cradle, stationary bassinet, chair, or car seat such as by providing feet, hooks or other support member. The second planar member 116 can be of adjustable height 174, such as by using straps or snaps to provide a seat portion of variable depth for accommodating children of various sizes.

Although the foregoing invention has been described in some detail by way of illustration and example for purposes of clarity of understanding, it will be obvious that certain changes and modifications may be practiced within the scope of the invention, as limited only by the scope of the appended claims.

What is claimed is:

1. A carrier for supporting a child in a reclining position and in a sitting position comprising:
   a rectangular support member comprising first and second side members and first and second end members;
   a first substantially planar support member having first and second side edges, first and second end edges and first and second surfaces;
   means for attaching said first substantially planar member to said rectangular support member such that said first substantially planar member is movable between first and second positions, said first and second end edges of said first planar member, in said first position, being spaced from said first and second end members of said support member, said first end edge of said first planar member being substantially adjacent to said first end member of said rectangular support member when said first planar member is in said second position;
   a second substantially planar member substantially extending between said second end member of said rectangular support member and said second end edge of said first planar member, said second planar member movable between third and fourth positions, said second planar member being in said third position when said first planar member is in said first position and said second planar member moving to said fourth position at the same time said first planar member is moving to said second position; and
   means for releasably attaching said first planar member in said second position.

2. A carrier, as claimed in claim 1, further comprising:
   a frame for supporting said carrier; and
   means for attaching said carrier to said frame.

3. A carrier, as claimed in claim 2, wherein:
   said means for attaching said carrier to said frame comprises means for pivoting said carrier with respect to said frame; and
   means for locking said carrier against pivoting with respect to said frame.

4. A carrier, as claimed in claim 2, wherein:
   said frame is foldable from an expanded use configuration to a folded compact configuration.

5. A carrier, as claimed in claim 4, further comprising:
   means for locking said frame in said unfolded configuration.

6. A carrier, as claimed in claim 2, wherein:
   said frame comprises wheels for transporting said carrier.

7. A carrier, as claimed in claim 1, comprising:
   bonnet means attached to said carrier for shading the child.

8. A carrier, as claimed in claim 7, wherein:
   said bonnet is movable between a first position covering said first end edge of said first planar support and a second position covering said second end edge of said first planar support.

9. A carrier, as claimed in claim 1, wherein said means for releasably attaching comprise:
   a first latch member attached to said first surface of said first planar member; and
   a second latch member, engageable with said first latch member, attached to said second surface of said first planar support.

10. A carrier, as claimed in claim 1, wherein:
    said first planar member is substantially horizontal in said first positiion and said second planar member is substantially vertical in said third position.

11. A carrier, as claimed in claim 1, wherein:
    said first planar member is inclined to the horizontal in said second position and said second planar member is inclined to the vertical in said fourth position.

12. A carrier, as claimed in claim 1, wherein:
    said first planar member is substantially parallel to said rectangular support member in said first position and said second planar member is substantially perpendicular to said rectangular support member in said third position.

13. A carrier, as claimed in claim 1, wherein:
    said first planar member is substantially inclined to said rectangular support member in said second position and said second planar member is substantially inclined to said rectangular support member in said fourth position.

14. A carrier for supporting a child in a reclining position and a sitting position, comprising:
a rectangular support member comprising first and second side members and first and second end members, defining a first plane;
a frame means for supporting said rectangular support member, said frame means comprising wheels for transporting said support member, said frame means being foldable from an expanded use configuration to a folded compact configuration;
a first substantially planar member having first and second side edges, first and second end edges and first and second surfaces and being movable between a first position and a second position, wherein:
said first planar member in said first position defines a second plane in a first angular relationship to said first plane, said first and second side edges and said first and second end edges of said first planar member are spaced from said first and second side members and said first and second end members of said rectangular support member and is substantially horizontal for whole body support of said child when said first planar support member is in said first position, and
said first end edge of said first planar member is substantially adjacent to said first end member of said support member and defines a second angle with respect to said rectangular support member, different from said first angle when said first planar member is in said second position;
means for releasably attaching said first planar member in said second position, said means comprising a first latching means attached to said upper surface of said first planar support member and second latch means attached to said lower surface of said first planar member;
a second planar member substantially extending between said second end member of said support member and said second end edge of said first planar member, defining a third plane at a third angle to said first plane, different from said first angular relationship when said first planar member is in said first position, and at a fourth angle with respect to said first plane when said first planar member is in said second position, said fourth angle being different from said third angle;
means for pivoting said rectangular support member between a first position wherein said first planar member is substantially horizontal for whole body support of said child and a second position different from said first position wherein said second planar member is positioned for use as a seat and said first planar member is in said second position and is positioned with respect to said second planar member as a back rest; and p1 means for locking said rectangular support member against pivoting with respect to said frame in at least one of said first position and said second position.

15. Apparatus for supporting a child in a reclining position and a sitting position comprising:
a child carrier support means;
frame means for supporting said carrier support means;
a first planar member;
means for attaching said first planar member to said support means, at least a portion of said first planar member being spaced from said support means;
a second planar member substantially extending between at least a portion of said support means and at least a portion of said first planar member and disposed at an angle to said first planar member;
means for pivotally attaching said carrier support means to said frame means;
means for locking said carrier support means in a first position wherein said first planar member is substantially horizontal for whole body support of the child by said first planar member; and
means for locking said carrier support means in a second position different from said first position wherein said second planar member is positioned for use as a seat and said first planar member is positioned with respect to said second planar member as a back rest.

16. Apparatus for supporting a child in a reclining position and in a sitting position comprising:
a carrier support means defining a first plane;
a frame means for supporting said carrier support means;
a carrier comprising first and second planar means, said first planar means movable between a first position and a second position, said first planar means in said first position defining a second plane in a first angular relationship to said first plane, at least a portion of said first planar means in said first position spaced from at least a portion of said carrier support, said first planar means in said second position defining a second angle with respect to the carrier support different from said first angle, said second planar means substantially extending between a portion of said carrier support and said first planar means, said second planar means defining a third plane at a third angle to said first plane, different from said first angle;
means for attaching said carrier to said carrier support;
means for pivotally attaching said carrier to said frame means;
means for locking said carrier against pivoting with respect to said frame; and
means for releasably attaching said first planar means in said second position, said means for releasably attaching further operative to position said second planar means at a fourth angle with respect to said carrier support, said fourth angle being different from said third angle.

17. A carrier for supporting a child in a reclining position and in a sitting position, comprising:
a rectangular support member comprising first and second side members and first and second end members;
a first substantially planar support member having first and second side edges, first and second end edges and first and second surfaces and having a first length for supporting a portion of the child;
means for attaching said first substantially planar member to said suppOrt member such that said first substantially planar member is movable between first and second positions, said first and second end edges of said first planar member, in said first position, being spaced from said first and second end members of said support member, said first end edge of said first planar member being closer to said first end member of said support member than said second end edge is to said second end member when said first planar member is in said second position, said first planar member providing said first length for supporting a portion of the child in said first and second positions;

a second substantially planar member having a second length for supporting a portion of the child and substantially extending between said second end member of said support member and said second end edge of said first planar member, said second planar member providing said second length for supporting a portion of the child when said first planar member is in said second position but not in said first position; and means for releasably attaching said first planar member in said second position.

* * * * *